(12) United States Patent
Simba

(10) Patent No.: US 7,814,693 B2
(45) Date of Patent: Oct. 19, 2010

(54) CD CASE FRAMER 2

(76) Inventor: Leonard Limson Simba, 193 Dexter Street, Winnipeg, MB (CA) R2R 2C8

( * ) Notice: Subject to any disclaimer, the term of this patent is extended or adjusted under 35 U.S.C. 154(b) by 718 days.

(21) Appl. No.: 11/669,126

(22) Filed: Jan. 31, 2007

(65) Prior Publication Data
US 2007/0119732 A1 May 31, 2007

(51) Int. Cl.
B65D 85/57 (2006.01)
(52) U.S. Cl. .................. 40/790; 211/40; 206/308.1
(58) Field of Classification Search .............. 40/790, 40/792, 794; 211/40
See application file for complete search history.

(56) References Cited

U.S. PATENT DOCUMENTS

| 100,962 | A | * | 3/1870 | Adams | 40/721 |
|---|---|---|---|---|---|
| 2,958,971 | A | * | 11/1960 | Plettner | 40/709 |
| 4,867,306 | A | | 9/1989 | Factor | |
| 4,951,826 | A | * | 8/1990 | Tompkins | 211/40 |
| 5,040,687 | A | | 8/1991 | Whittington | |
| 5,148,925 | A | * | 9/1992 | Althoff et al. | 211/40 |
| 5,351,835 | A | | 10/1994 | Hallgren | |
| 5,372,263 | A | * | 12/1994 | Niekel | 211/41.12 |
| 5,415,396 | A | * | 5/1995 | Huang | 473/417 |
| 5,437,376 | A | | 8/1995 | Larsen | |
| 5,518,125 | A | | 5/1996 | Colosimo | |
| 6,073,764 | A | | 6/2000 | Haas | |
| 6,116,432 | A | | 9/2000 | Rohner | |
| 6,446,799 | B1 | * | 9/2002 | Simba | 206/308.1 |
| 6,874,645 | B2 | * | 4/2005 | Broderick | 211/40 |
| 2003/0046849 | A1 | * | 3/2003 | Lin | 40/792 |
| 2006/0231514 | A1 | | 10/2006 | Fallander | |

FOREIGN PATENT DOCUMENTS

| CA | 2340321 | | 1/2003 |
|---|---|---|---|
| JP | 2002051885 | A * | 2/2002 |

* cited by examiner

Primary Examiner—Cassandra Davis

(57) ABSTRACT

A wall or vertically mounted framing device for holding and displaying the full front cover of a single compact disc case comprising a housing which is a plane of suitable thickness having walls that cover the edges of said case and within said plane are leveling and fulcrum members allowing the said case to lie level in the display position and swivel out in the dismount position and spring assembly to assist in holding and dismounting said case, said housing having mounting means and around said device is a sash which is a means to serve as a decorative edging, and to secure the left edge of said case, and the spring assembly.

2 Claims, 2 Drawing Sheets

CD CASE FRAMER 2

CROSS REFERENCE TO RELATED APPLICATIONS

Application Ser. No. 09/813,728 filed in U.S. Mar. 22, 2001

Application Ser. No. 2,340,321 filed in Canada Mar. 14, 2001

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is a wall or vertically mounted framing device that securely holds and displays the full front cover of a single compact disc case. CD Case Framer 2 is an improvement of previously patented invention titled "CD Case Framer" by the same inventor as mentioned in above Cross Reference to Related Applications.

Compact disc cases or CD cases are commonly transparent plastic boxes that protect and keep individual CD jewels. They are labeled with front cover arts or inserts depicting their content. And since CD's are becoming a common home and office items, their cases whether empty or not are commonly stacked without giving attention to the mentioned cover arts.

CD racks or towers are space savers that are used to efficiently store CD cases. They do this by stacking CD's with only the title edge visible.

Inventors created several types of CD frames or holders and disclose types of wall mounted or free standing racks which can hold single or several CD cases in the following inventions;

U.S. patent application 20060231514 to Fallander (2006)
U.S. Pat. No. 6,446,799 to Simba (2002)
Canada patent 2,340,321 to Simba (2001)
U.S. Pat. No. 6,116,432 to Rohner (2000)
U.S. Pat. No. 6,073,764 to Haas (2000)
U.S. Pat. No. 5,518,125 to Colosimo (1996)
U.S. Pat. No. 5,437,376 to Larsen (1995)
U.S. Pat. No. 5,351,835 to Hallgren (1994)
U.S. Pat. No. 5,372,263 to Nielkel (1994),
U.S. Pat. No. 5,040,687 to Whittington (1991)
U.S. Pat. No. 4,867,306 to Factor (1989)

Prior arts just mentioned have paid attention to displaying the CD case cover arts but they were typically modular racks or having plurality of frames and therefore serving the purpose of framing or displaying multiple CD cases. They make use of profiled bars or rails, hook-and-loop, contact adhesives, etc. to mount or hold few to several compact disc cases.

Moreover, prior art comprising a swing out holder pivoted to a fixed housing similar to the present design of typical CD cases or jewel boxes can only be manufactured by plastic injection. This method requires very costly molds and tooling designs.

Aside from ordinary CD's, CDR's or recordable CD's, and CDRW's or rewritable CD's as well as DVD's in similar box cases including DVDR's and DVDRW's as well as mini DVD's and Blue Ray Discs are now getting popular and becoming commonplace. Many people record and create their own music or programs and store their digital photos on these new kind of CD's. To make a distinction from the commercial music and software CD's, I think, many people wants to display separately their favorite or personal CD's in a special place at home or office. They feel proud to show these to friends and visitors in the same way they feel about certificates and diplomas hung on the wall.

BRIEF SUMMARY OF THE INVENTION

This is where the idea behind the improvement of my CD Case Framer 2 comes in;

(a) to be able to simplify the function and embodiment of the previous "CD Case Framer" by eliminating the use of the "swing out holder" and its associated parts like the "foot plate", "bracket", "pivot rings" and "stopper";

(b) to be able to display both standard and slim style CD cases which have half the thickness of the standard CD cases by simply utilizing an add-on part. This feature is not possible with the previous CD case Framer;

(b) to be able to display a single favorite or personal CD case more like a framed picture by using a sash or rectangular window which is not included in previous "CD Case Framer";

(b) to be able to make a CD Case Framer without the use of costly plastic injection method because CD Case Framer 2 employs a simple assembly method that uses common materials like wood blocks, paper based materials and recycled plastic. In between, it can also be mass produced using a less costly thermo-vacuum forming;

(c) As in the previous "CD Case Framer, it retains the same features like displaying CD cases singly without having to display and mix them with all the rest of CD's or completely fill the typical CD tower, rack, frame or holder;

(d) securely hang or vertically mount a CD case without having to use permanent or semi permanent fixing devices on a CD case like adhesives, hook-and-loop, etc. thus preserving the CD case in its original form and making it convenient to stow it back to their storage racks or boxes whenever the owner wants;

(e) providing a CD case framer which can be displayed in a way not possible with multiple or modular frames. For example, displaying CD cases on narrow walls, in between picture frames, souvenirs, memorabilia, etc. and, (f) creating various patterns by using several of these CD case framers. Example is an art mosaic consisting of several CD case framers mounted edge to edge vertically, horizontally, diagonally, etc., to cover a specific wall area or to form any artistic shapes.

DETAILED DESCRIPTION OF THE INVENTION

Typical Embodiment

Figure 1A:
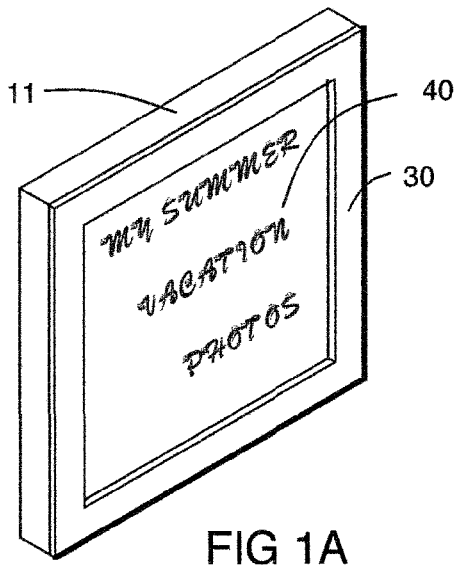
FIG. 1A is an isometric view showing a CD case displayed in the CD Case Framer 2.
Figure 1B:
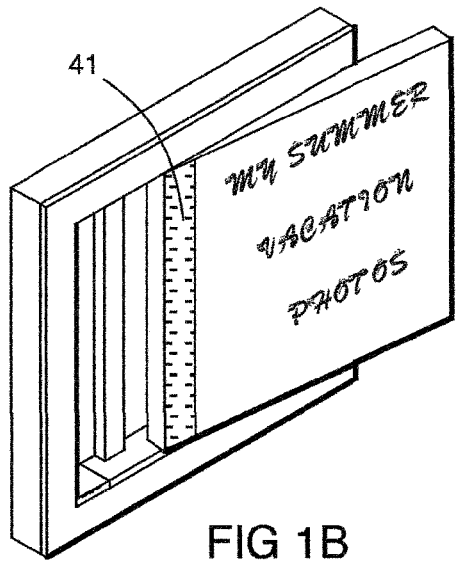
FIG. 1B is an isometric view showing the CD case fully withdrawn out the CD Case Framer 2.
Figure 1C:
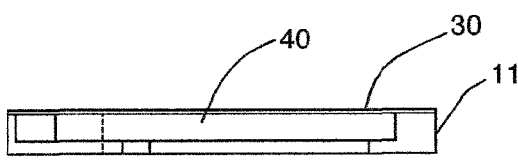
FIG. 1C shows the bottom view of FIG. 1A.
Figure 1D:
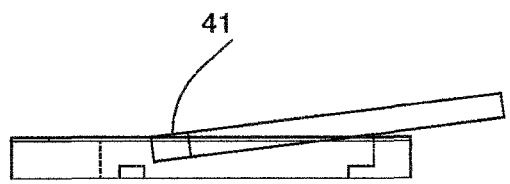
FIG. 1D shows the bottom view of FIG. 1B.
Figure 1E:
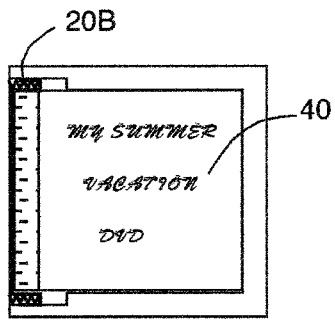
FIG. 1E is a front view showing how the spring assembly acts against the left edge of a CD case.
Figure 1F:
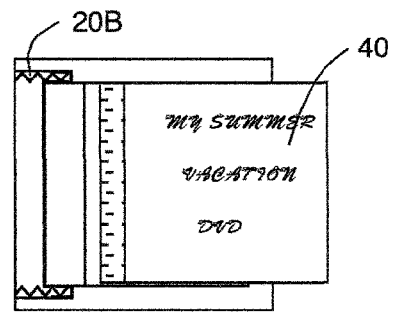
FIG. 1F is a front view showing the spring status when the CD case is fully withdrawn out.
Figure 1G:
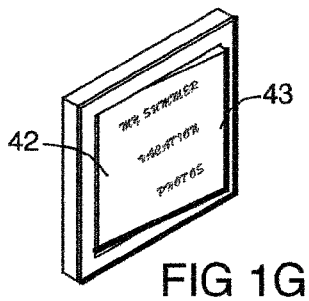
FIG. 1G is a scaled down isometric view showing the CD case swiveled out the CD Case Framer 2.
Figure 1H:
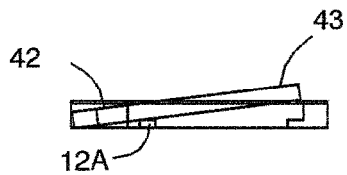
FIG. 1H; is a scaled down bottom view of FIG. 1G.

Referring to the drawings in FIGS. 1A, 1B and 1G: a compact disc or CD case (40) is held and securely displayed frontally in the CD Case Framer 2 thus showing its full front cover. Its edge strip or hinge part (41) is covered by the left part of sash (30). Removing the CD case out from the frame is done by pushing down on its leftmost part (42) until it swivels out. In this way, the said case is accessible by its rightmost part (43) ready to be withdrawn sideways for removal or reinserted for framing.

Figure 2A:
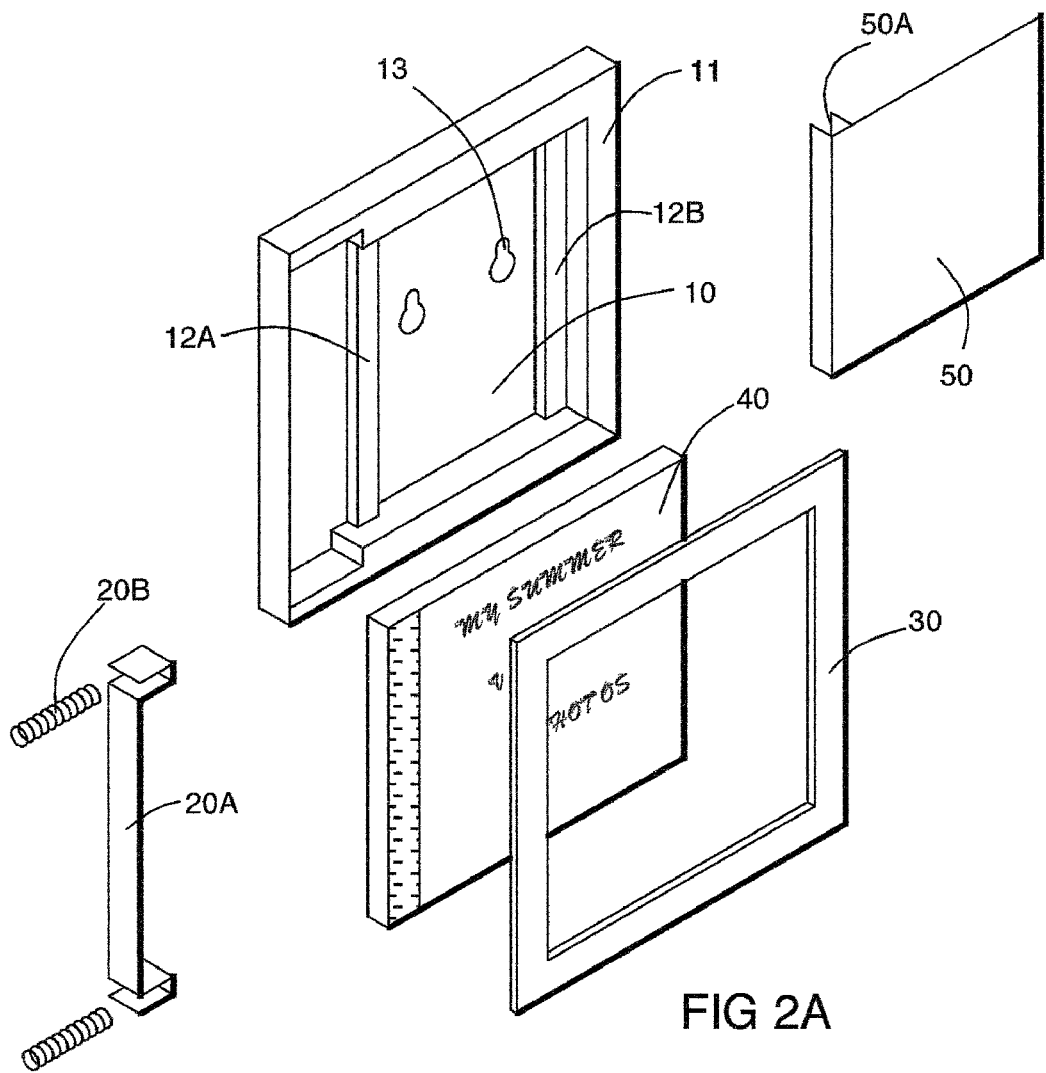
FIG. 2A shows the exploded view of the CD Case Framer 2.

Referring to the drawing in FIG. 2A; a housing is a plane (10) of suitable thickness having perpendicular walls (11). Within said plane are two members namely fulcrum member (12A) and leveling member (12B) lie in the same plane (10). The said members have elevation so that the top plane of the CD case (40) is level with the sash (30). Mounting holes (13) are means to hang the frame to any vertical surfaces using screws or anchoring device.

An optional add-on piece (50) fitted over the members (12A) and (12B) as a means to increase the elevation of the said members so that a slim style CD case having half the thickness than the standard cases can be used. This piece can have a snap-on part (50A) that clips over said members.

A spring assembly consist of a rigid thin strip (20A) formed in such a way that the top and bottom parts are able to accommodate part of the two helical coil springs (20B). The spring assembly fits inside the housing as shown in FIG. 2B.

Figure 2B:
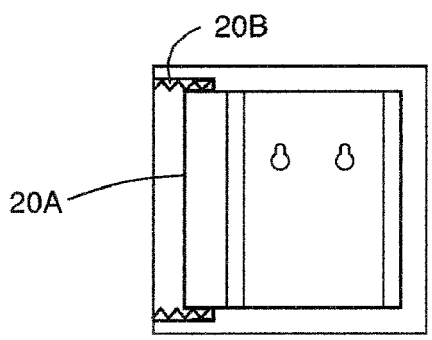
FIG. 2B is a front view showing the CD Case Framer 2 without the sash thus showing how the spring assembly is positioned inside the frame.
Figure 2C:
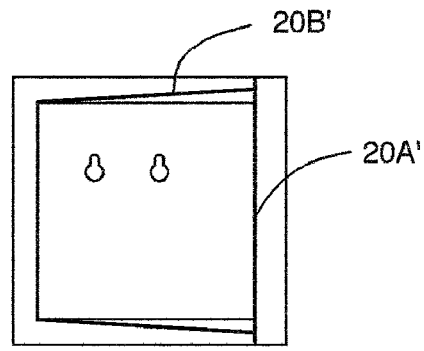
FIG. 2C is the back view of the CD Case Framer 2 showing how an elastic band can be used instead of the helical coil spring.

In FIG. 2C, an elastic band (20B') can be used to do the same function of the helical coil spring. The elastic band is stretched and wrapped around and through the hollow of walls (11) and the ends are anchored to the corresponding ends of the rigid thin strip (20A').

A sash (30) is a frame edging made from a thin piece of material like sheet metal, thin plate of glass, plastic or wood, It also serves as a securing cover for the spring assembly. The said sash (30) can be glued or secured by small dowels pins to the housing.

In FIGS. 2B and 2C, the CD Case Framer 2 is shown without a CD case, the spring (20B) is normally extended and pushes the thin strip (20A) towards the right. The sash (30) confines the spring so that the spring force is only directed sideways to the right. The same also applies when using elastic band (20B') and strip (20A') as in FIG. 2C.

Operation

Referring to the drawings in FIGS. 1A to 1H, the stages of operation of the invention shown, CD case is inserted sideways as shown in FIG. 1B so that CD case edge (41) engages squarely the spring assembly (20A) and continues until its leftmost edge is stopped by the left housing wall as shown in FIG. 1G. In this condition, the edge strip of the CD Case (41) is held by the left side of the sash (30). When the CD case is finally pushed in, the rightmost side of the CD case is also locked by the spring force that acts to push its right edge against the right housing wall. In this condition, the CD case is securely framed by its edge strip (41) being held by the left side of the sash (30) and by the spring force that pushes the CD case right edge against the left housing wall. The frictional force exerted by the spring prevents the CD case from swiveling out. The vertical members (12A) and (12B) having equal elevation, makes the CD case level with respect to the vertical surface (10) and flush with sash (30). The CD case is now securely framed displaying its front cover art.

Referring to FIG. 1G, to dismount the CD case, it is necessary to push down its leftmost side (42) until it the opposite side swivels out as shown in FIG. 1B. This is made possible by vertical member (12A) which acts like a fulcrum that raises the rightmost side of the CD Case (43). The CD case can now be withdrawn out because its rightmost side is accessible.

In practical application, a CD case may or may not contain a jewel and therefore can also be picture or photograph encased in a similar box or sandwiched glass or transparent plastic sheets.

I claim:

1. A framing device displaying the front cover of a media case comprising housing with a planar back surface, a top side wall, a bottom side wall, left side wall, and right side walls, wherein the side walls define a planar front opening;
    a levering member adjacent the right side wall
    a fulcrum member extending from the back surface, wherein the fulcrum extends from the top side wall to the bottom side wall and is spaced between the left and right side wall; the fulcrum allows the media case to pivot or swivel about the fulcrum in a first position wherein the media case is out of the plane of the front opening of the housing to provide a means for removing the media case and second position wherein the media case is positioned within the housing such that the right edge of the media case abuts the leveling member and a front surface of the media case lies within the plane of the front opening;
    a spring assembly predisposed in said housing adjacent the left side wall; the spring assembly is adapted to urge the leftmost edge of said media case to eject it in the first position and to urge the right side of the media case into abutment with the right side wall thereby securing the case within the said housing in the second position;
    a removable sash attached to the front of the housing for hiding the spring assembly and the side walls of the housing and peripheral edges of the media case in second position;
    wherein the case further comprises a full front cover selected from the group consisting of pictures, photos and designs encased in said case; and
    wherein the case is selected from the group consisting of CD, CDR, CDRW, DVD, DVDR, DVDRW, Blue Ray, and memory media cases and boxes and picture wafers.

2. The framing device according to claim 1 further comprising a means for mounting the frame device to a support surface.

* * * * *